(No Model.) 5 Sheets—Sheet 1.
W. L. HEDENBERG.
CONDUIT ELECTRIC RAILWAY SYSTEM.
No. 534,475. Patented Feb. 19, 1895.
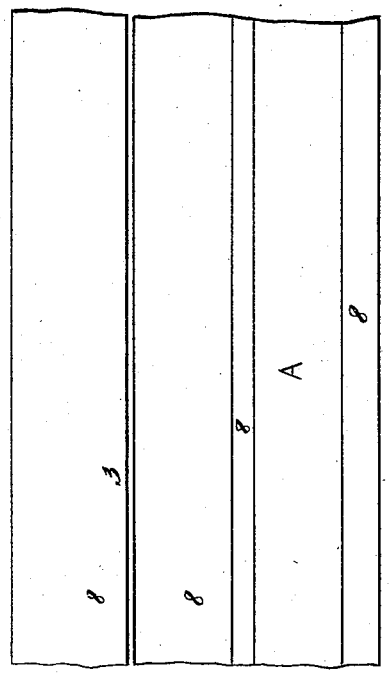
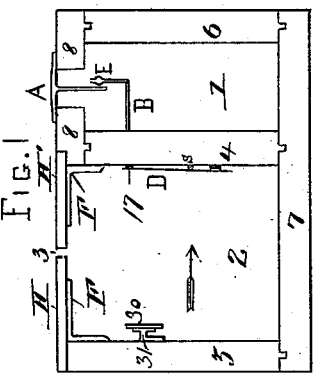
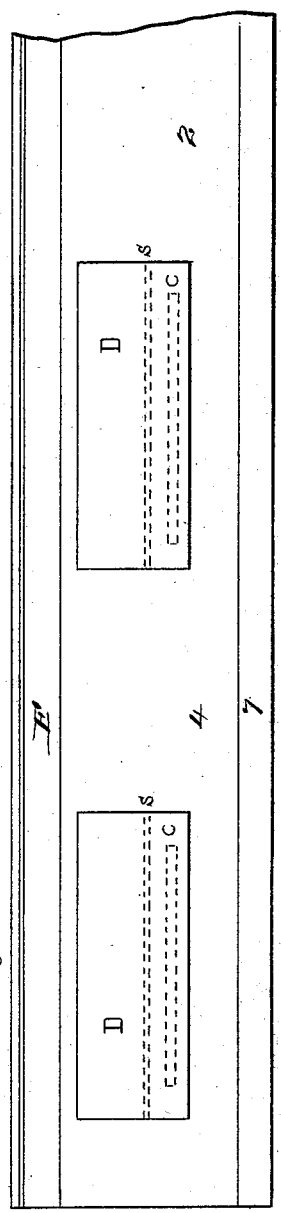
WITNESSES:
INVENTOR
Wm L Hedenberg
BY
T. F. Bonney
his ATTORNEY.

(No Model.) 5 Sheets—Sheet 2.
W. L. HEDENBERG.
CONDUIT ELECTRIC RAILWAY SYSTEM.
No. 534,475. Patented Feb. 19, 1895.
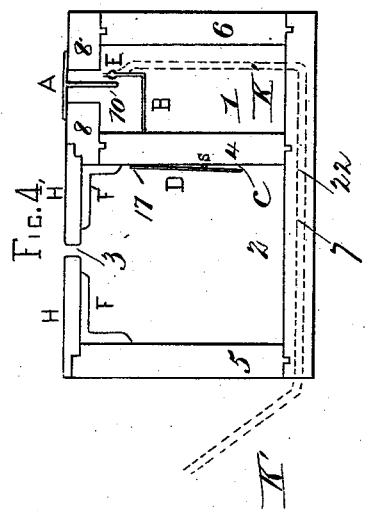
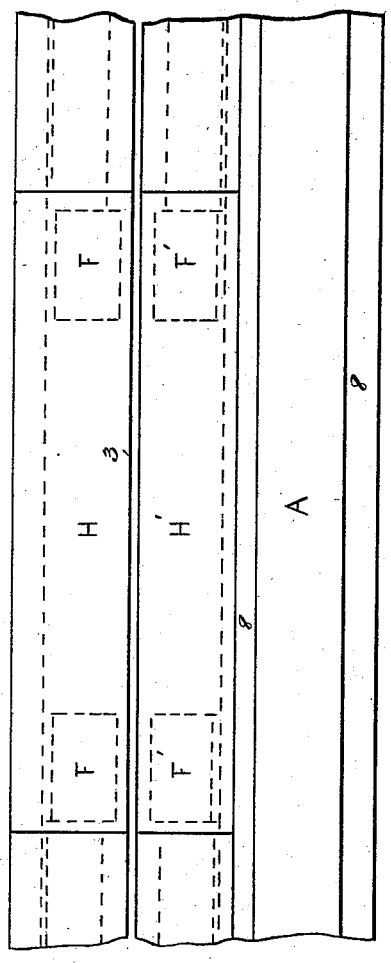

(No Model.)  5 Sheets—Sheet 3.
W. L. HEDENBERG.
CONDUIT ELECTRIC RAILWAY SYSTEM.
No. 534,475.  Patented Feb. 19, 1895.
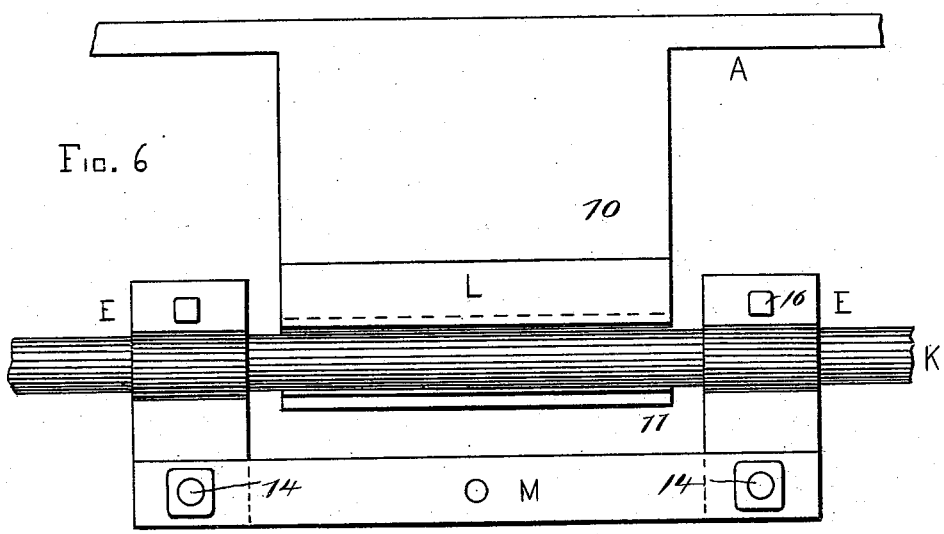
Fig. 6
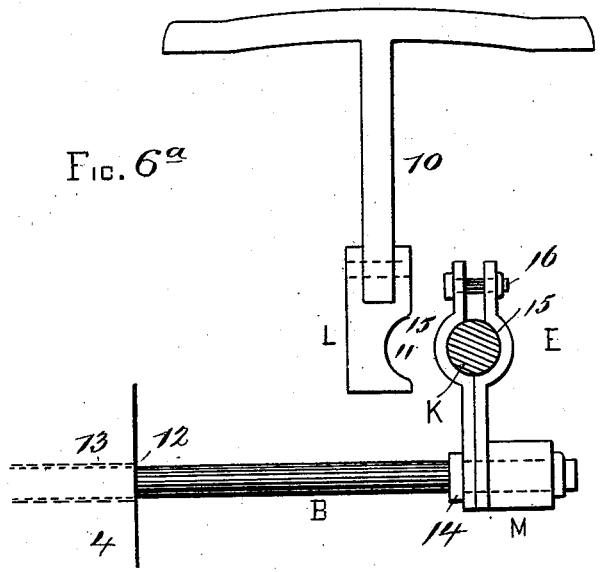
Fig. 6ª
WITNESSES:  INVENTOR
  Wm L Hedenberg
  BY
  his ATTORNEY.

(No Model.) 5 Sheets—Sheet 4.
W. L. HEDENBERG.
CONDUIT ELECTRIC RAILWAY SYSTEM.
No. 534,475. Patented Feb. 19, 1895.
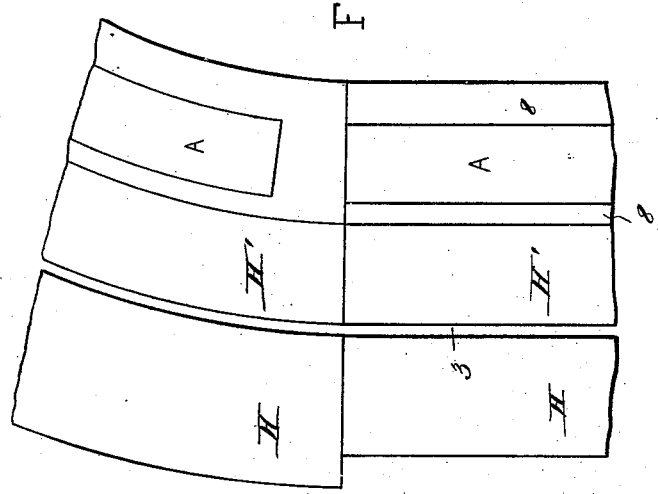
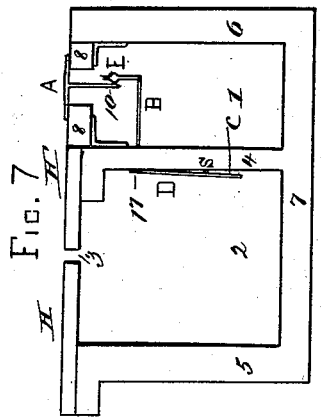
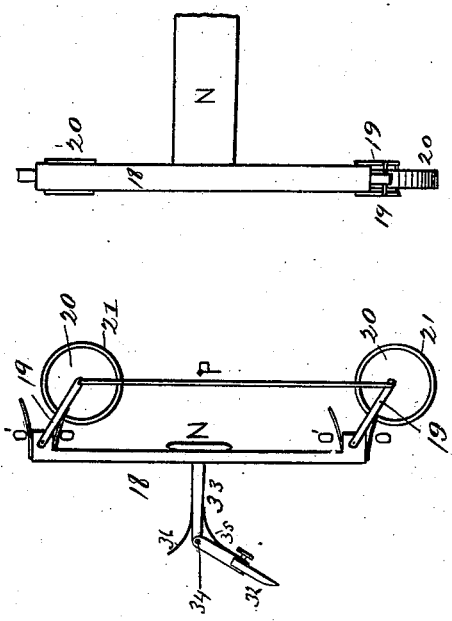
WITNESSES:
E. M. Fort
Matt Jephson Rourke.
INVENTOR
Wm L. Hedenberg
BY
T. F. Bourne
his ATTORNEY.

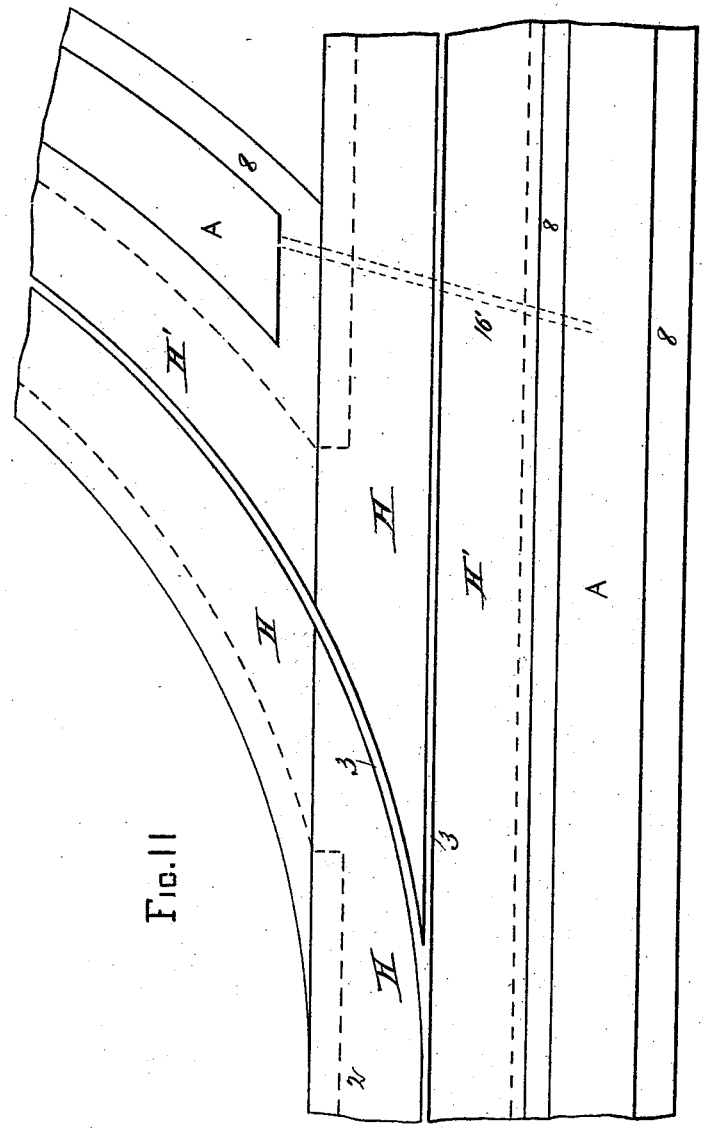

UNITED STATES PATENT OFFICE.

WILLIAM L. HEDENBERG, OF NEW YORK, N. Y.

CONDUIT ELECTRIC-RAILWAY SYSTEM.

SPECIFICATION forming part of Letters Patent No. 534,475, dated February 19, 1895.

Application filed June 5, 1894. Serial No. 513,583. (No model.)

*To all whom it may concern:*

Be it known that I, WILLIAM L. HEDENBERG, a citizen of the United States, and a resident of the city, county, and State of New York, have invented certain new and useful Improvements in Underground Electric-Railway Systems, of which the following is a specification.

My invention relates to the class of electric railways in which the conductor or main feed wire is placed beneath the surface of the street, and more particularly to the class of railways in which the current is delivered to the motors on the cars from surface plates or contacts.

The object of my invention is to provide means whereby the said surface plates will be entirely out of circuit with the conductor or feed wire excepting while a car is passing over said plates.

Another object of my invention is to provide a practically water-tight conduit in which the conductor or feed wire is located, in conjunction with means located outside of said conduit for closing the circuit between said conductor and the surface plates.

My invention is distinguished from other underground railway systems in that there is no arm or bar, depending from a car, which passes into the conduit in which the conductor is located.

The invention consists in two conduits closed substantially water-tight from each other, in one of which conduits the conductor or feed wire is placed, and into the other conduit a depending arm from a car projects to operate the connections in the other conduit to close the circuit between the conductor and surface plates or contacts. By this means water that might enter one conduit through its slot is kept from entering the conduit in which the conductor is located.

The invention further consists in the novel details of improvement and the combinations of parts that will be more fully hereinafter set forth and then pointed out in the claims.

Reference is to be had to the accompanying drawings, forming part hereof, wherein—

Figure 1 is a transverse view of an underground electric railway system embodying my invention. Fig. 2 is a plan view thereof. Fig. 3 is a longitudinal view of the interior of one conduit, looking in the direction of the arrow in Fig. 1. Fig. 4 is a view corresponding to Fig. 1, showing means to permit access to one of the conduits. Fig. 5 is a plan view thereof. Fig. 6 is an enlarged detail side view of the surface plate and conductor, showing the supports for the latter. Fig. 6$^a$, is an edge view thereof, looking from the left in Fig. 6. Fig. 7 is a view corresponding to Fig. 1, showing an arrangement of the conduit for rounding curves. Fig. 8 is a plan view thereof. Fig. 9 is a plan view of the trolley carried by a car for closing the circuit, in the closed conduit, between the conductor and the surface plates. Fig. 10 is a side view thereof, and Fig. 11 is a plan view showing means for keeping the closed conduit tight where the lines branch off.

In the accompanying drawings, in which similar letters and numerals of reference indicate corresponding parts in the several views, the numeral 1 indicates a closed conduit in which the conductor or main feed wire K is located, and 2 is a conduit parallel therewith into which an arm N, from a car (not shown) passes through a slot 3, for closing the circuit between the conductor K and the surface plates or contacts A. The conduits 1, 2, are preferably separated by a single wall 4, and said conduits may be constructed from any suitable or desired material. I preferably form the walls 4, 5, 6, and the bottom 7 of said conduits from timbers that have been creosoted to withstand water and moisture, and the meeting edges of said walls of timber may be tongued and grooved, as shown.

H, H', are longitudinal plates over the conduit 2, forming the slot 3 between them, which plates are shown supported by angle irons or brackets F, suitably carried by the walls of the conduit, said plates being suitably secured to said angle irons or brackets. By this means the conduit 2 is closed excepting for the slot 3.

On the walls 4, 6 of the conduit 1 are longitudinal timbers or beams 8, 8, suitably secured to said walls, as by tongues and grooves, or otherwise, and upon the timbers or beams 8, 8, are placed the surface conductor plates or contacts A, which extend longitudinally over the conduit 1.

In Fig. 7 the timbers or beams 8, are shown supported on angle irons or beams 9, 9, carried by the walls 4, 6, of the conduit 2.

The surface plates A, A, may be made of any desired length, say six feet long each, and at their ends they are insulated from each other by any desired means. These plates A may be secured in position over the conduit 1 by any suitable means. The plates A are preferably made of brass, but may be made of any other suitable conducting metal.

The surface plates A have one or more depending webs or arms 10, that pass into the conduit 1, the plate A and webs or arms 10, forming a T at intervals, as shown. The plate A and webs or arms 10 may be cast in a single piece of metal. This T-shaped plate A is to be brought into circuit or contact with the conductor K, as a car passes along, and for this purpose to each web or arm 10 is, or may be, secured a piece of brush carbon L (preferably not covered with copper), one side of which is preferably grooved at 11, to receive one side of the conductor K (see Figs. 6 and 6ª) to make good electrical contact therewith.

The conductor K is supported and brought into circuit with the surface plate or contact A, or its carbon L, as follows: B are rods or arms that pass through and slide in openings 12 in the wall 4, as shown. The openings 12 are preferably provided with brass tubes or bushings 13 in which the rods B fit closely, and in which said rods can slide. The rods or arms B are located principally within the conduit 1, their ends entering the conduit 2 through the wall 4, the openings 12 being the only openings between said conduits, and as the rods or arms B fit snugly in the tubes 13, or openings 12, there is very little danger of water leaking from conduit 2 into conduit 1, through said openings, should water rise as high in conduit 2 as the openings 12.

Further safety from the passage of water from conduit 2 to conduit 1 will be explained hereinafter.

The rods or arms B each carry a support or bar M, within conduit 1, said supports being preferably made of vulcanized fiber, or other suitable non-conducting material. The supports M carry wire holders E, that are shown bolted on said supports M by bolts 14, and made of any suitable material. Said wire holders are shown made in two pieces having grooves 15, to receive and clamp the conductor K, a bolt or screw 16 acting to bind said wire holders upon the conductor or wire K. (See Figs. 6 and 6ª.) By this means the rods B, supports M and holders E sustain the conductor or wire K in proximity to the webs 10, or carbons L, but normally out of contact therewith, so that said conductor can be brought into electrical connection therewith. This is accomplished as follows:—Within the conduit 2 are a series of plates or bars D, of suitable length, which are pivotally carried by the wall 4, as by hinges or pivots S. The upper parts or edges of the plates D are pivotally connected with the rods B, springs C located between the wall 4 and plates D acting to hold said plates, as in Fig. 1, so as to push the rods B toward the conduit 1, to normally hold the conductor K out of contact with carbon L or web 10. The springs C may be secured to the plate D, and bent to press against the wall 4, or otherwise arranged as desired. At the ends of the rods B, adjacent to the plates D, and within the conduit 2, are preferably placed washers or valves 17, which are pressed by the action of the springs C against the wall 4 to close the openings 12 through which the rods B pass. By this means said openings are normally kept closed to prevent water from running from the conduit 8 into conduit 1, through openings 12, should it rise so high. The conduits 1 and 2 may be connected with a sewer or other catch basin in any desired manner.

The plates D are to be moved alternately by a passing car to cause electrical connection between the plates A and conductor K, and for this purpose a suitable trolley is carried within the conduit 2 by an arm N, that depends from a car (not shown) and passes through the slot 3. (See Figs. 9 and 10.) This trolley is shown composed of a bar 18, carried by the arm N, which bar carries pivoted arms 19, 19, in which rollers 20, 20, are journaled, said arms being pivotally connected by a rod P so that they will have uniform movement. The rollers 20 may have rubber rims 21. Said rollers are spaced such a distance apart that one of them will always be in contact with a plate D.

O, O', are springs carried by the bar 18, and arranged to bear alternately on arms 19 to hold the rollers 20 against the plates D as the car travels. The arrangement is such that the springs O act to press the rollers 20 against the plate D when the car travels in one direction, and the springs O' act for the same purpose when the car travels in the opposite direction, so that the rollers 20 can trail at all times. To accomplish this reversing of the rollers 20 the conduit 2, at the end of a route, may be widened so that the rollers 20 can swing outwardly to permit the opposite springs to act.

The car is to be provided with suitable brushes to bear on the surface plates A, so as to collect the current from said plates and conduct it to the motor. The brushes will be arranged so that one brush will always bear on one plate.

The operation is as follows:—The conductor K is normally out of circuit with the plates A. As the car passes along its trolley bears on the lower portion of a plate D, thereby swinging it on its pivot S, which acts to draw the rod B, which thereupon causes the conductor K to engage carbon L or web 10, so that the plate A will be supplied with current for the motor. As the car now passes along the plates D are alternately moving to draw the respective rods B to close the circuit at different points through K and A, whereby a continuous current is supplied to the motor on the car. It will be understood, however, that the plates beneath a car only will be in circuit with the conductor K, and as a car passes from a plate it will immediately be thrown out of circuit with the conductor; also, that the plates will not be made long enough to project beyond the end of a car while receiving current. Thus no current can reach the surface of the street while a car is not passing as the plates A cannot be brought into circuit except beneath a car.

At suitable intervals man-holes may be provided to permit access to the conduit 2. Means for this purpose are shown in Figs. 4 and 5, in which case two pates H, H' are made removable and rest upon enlarged brackets F, F' and can be suitably secured thereto to permit ready removal of said plates.

When the conduit is to be curved, as on the intersection of streets, the walls 4, 5, 6 and 7 of the conduits may be made in a casting, as in Fig. 7, the plates H, H' and A being also cast in suitable shape, as in Fig. 8, and suitably fitted on said casting.

When it is necessary that the conduit should branch I provide as follows: The conduit 1 from the branch line stops against the outer wall of conduit 2, so as not to open therein, and the branch wire K' is carried down through conduit 1 to the bottom 7, thence through an aperture or groove 22 therein beyond the wall 5 up into the adjacent abutting conduit 1. (See dotted lines in Fig. 4). The places where the conductor passes will be filled with tar or its equivalent non-conductor.

My improved system will be found simple in construction, and practical in operation, as water is kept from reaching the conductor in its conduit 1, and therefore leakage of the current is prevented.

In case it is desired to have the current return through a conductor instead of through the rails, 1 may place a suitable conductor 30 in the conduit 2, which conductor may be supported by brackets 31, carried by the wall of the conduit and insulated therefrom. (See Fig. 1.) In this case the trolley may carry a suitable contact brush or other contact 32 to engage said conductor 30. In Fig. 9 the bar 18 is shown provided with an outwardly extending support 33, on which the brush or contact 32 is pivoted, as at 34, springs 35, 36, acting to hold the contact 32 against the conductor 30, in whichever direction the trolley is traveling, in manner similar to the action of springs O, O' on rollers 20.

Having now described my invention, what I claim is—

1. The combination of two separate parallel conduits one closed and the other having an opening or slot, a main conductor in the closed conduit and sectional conductors or plates over the closed conduit, a circuit closer in the closed conduit to make electrical connection between the main conductor and the sectional conductors or plates, and mechanism in the open conduit for operating said circuit closer to close the circuit between said main conductor and the sectional conductors or plates, substantially as described.

2. Two separate parallel conduits, one having surface plates above it and a conductor in said conduit to be brought into circuit with said plates, the other conduit having means for closing the circuit between said conductor and plates, substantially as described.

3. Two separate conduits, one having surface plates provided with contact webs or arms, and a conductor in said conduit for electrical connection with said webs or arms, the other conduit having devices for closing the circuit between said conductor and said webs or arms, substantially as described.

4. Two conduits having a wall between them, surface plates over one conduit, a conductor in said conduit and sliding rods connected with said conductor, combined with pivoted plates or bars in the other conduit connected with said rods and adapted to be operated by a passing car to close the circuit between said conductor and said surface plate, substantially as described.

5. Two conduits having a wall between them, one conduit having surface plates provided with depending webs or arms, a conductor in said conduit for connection with said webs or arms, and rods connected with said conductor and supported by said wall, combined with plates pivoted within said other conduit and connected with said rods, and adapted to be moved by a passing car, substantially as described.

6. The combination of two parallel conduits having a wall between them, surface plates over one conduit having depending webs, a conductor for electrical connection with said webs and rods having supporting bars M and holders E combined with plates pivotally carried in the other conduit and connected with said rods, and springs for holding said parts in their normal positions, substantially as described.

7. The combination of two conduits having a wall between them, surface plates A having depending webs or arms provided with grooved contacts L, a conductor to engage said contacts, rods carrying said conductor and passing through holes in said wall and tubes or bushings in said holes with plates pivoted on said wall in the other conduit, and connections between said rods and said plates, whereby the latter can operate the former by a passing car, substantially as described.

8. The combination of two conduits having a wall between them, surface plates over one conduit, a conductor for electrical connection with said plates, and rods carrying said conductor and passing through holes in said wall, with washers or valves operated by said rods for closing said holes, and plates or bars in the other conduit for operating said rods, substantially as described.

9. A contact or surface plate having a depending web or arm, combined with a conductor, and means for moving said conductor against said web or arm by a passing car, substantially as described.

10. The combination of a bar carrying pivoted arms, insulated rollers carried by said arms and springs to bear on opposite sides of said arms to hold said rollers in position to operate circuit closing mechanism when either of said springs are acting on said arms, substantially as described.

11. A double trolley composed of a bar, arms pivotally carried thereby and having rollers, springs O for holding said arms in one position and springs O' for holding said arms in the opposite position, substantially as described.

12. Two conduits side by side one being closed and the other having a slot, the closed conduit containing a conductor, and branch conduits, one leading direct from the slotted conduit, the other being closed and abutting against the wall of the slotted conduit, and a branch conductor passing from the first mentioned conductor to an opening in the bottom of said conduit, and thence into the other closed conduit, substantially as described.

13. The combination of a conduit, surface plates or contacts thereover, a conductor therein and means for closing the circuit between said plates and said conductor another conduit, a return conductor therein and a contact carried by a car to engage said return conductor, substantially as described.

14. A trolley carrying rollers to operate circuit closing devices, and a contact pivotally carried by said trolley to engage a return conductor when traveling in opposite directions.

WILLIAM L. HEDENBERG.

Witnesses:
T. F. BOURNE,
E. M. FORT.